(12) United States Patent
Liu

(10) Patent No.: US 6,799,371 B2
(45) Date of Patent: Oct. 5, 2004

(54) METHOD FOR MANUFACTURING A STEEL TIRE MOLD

(76) Inventor: Yu-Ren Liu, No. 48, Sec. 2, Er Bau Rd., Pu Hsin Hsiang, Changhua Hsien (TW)

(*) Notice: Subject to any disclaimer, the term of this patent is extended or adjusted under 35 U.S.C. 154(b) by 245 days.

(21) Appl. No.: 10/217,442

(22) Filed: Aug. 14, 2002

(65) Prior Publication Data

US 2004/0034445 A1 Feb. 19, 2004

(51) Int. Cl.[7] .............................................. G06F 15/00
(52) U.S. Cl. ..................... 29/894.37; 700/182; 700/169; 700/192
(58) Field of Search ....................... 29/894.37; 700/182, 700/169, 192

(56) References Cited

U.S. PATENT DOCUMENTS

| | | | | |
|---|---|---|---|---|
| 430,845 A | * | 6/1890 | Gendron ................... | 29/894.37 |
| 3,256,123 A | * | 6/1966 | Hart ......................... | 29/894.37 |
| 3,415,923 A | * | 12/1968 | Petersen .................... | 264/221 |
| 4,691,431 A | * | 9/1987 | Hayata ...................... | 76/101.1 |
| 5,109,589 A | * | 5/1992 | Cramer et al. ............ | 29/527.4 |
| 5,234,326 A | * | 8/1993 | Galli et al. ................ | 425/46 |
| 5,247,151 A | * | 9/1993 | Hagerman ................. | 219/69.17 |
| 5,548,194 A | * | 8/1996 | Hamura et al. ........... | 318/568.13 |
| 5,761,390 A | * | 6/1998 | Koshishiba et al. ....... | 700/250 |

FOREIGN PATENT DOCUMENTS

JP    405147044 A  *  6/1993  ........... G06F/15/60

OTHER PUBLICATIONS

"Phantom Redundancy: A High Level Synthesis Approach for Manufacturing"–Balakrishnan et al, University of Massachusetts at Amherst, IEEE 1995.*
"Automated CAD–Guided Robot Path Planning for Spray Painting of Compound Surfaces"–Sheng et al, Ford Motor Company, Scientific Research Division, IEEE 2000.*

* cited by examiner

Primary Examiner—Leo Picard
Assistant Examiner—Michael D. Masinick
(74) Attorney, Agent, or Firm—Charles E. Baxley

(57) ABSTRACT

A method for manufacturing a steel tire mold that uses CAD and CAM software to design the shapes of the mold and develop numerical sequences for computer numerical controlled (CNC) machines, electrodes for an electric discharge machine (EDM) and characters and designs on the tire, and the CNC lathe forms the different designed parts. Alignment and assembly holes are bored so the parts can be assembled to form a semi-finished mold. The tread design is formed in the electrode by the CNC machine, and the electrode is used with an electric discharge machine to cut the tread design in the mold. The CNC engraving machine cuts the characters and designs in the mold. Finally, the mold is dressed to remove any burrs, and the mold is a finished product.

3 Claims, 5 Drawing Sheets

METHOD FOR MANUFACTURING A STEEL TIRE MOLD

BACKGROUND OF THE INVENTION

1. Field of the Invention

The present invention relates to a method for manufacturing a steel mold, and more particularly to a method for manufacturing a steel tire mold.

2. Description of Related Art

Generally, tires are manufactured with steel molds, and the mold is composed of several parts. A tire has a tread to increase the friction between the tire surface and ground, two sidewall plates and bead rings. Consequently, with reference to FIG. 3, a tire mold (30) comprises two half shells (31, 312). With reference to FIGS. 3 and 4, the half shell (31) may be composed of a single part, or the half shell (31') may be composed of several parts. The half shells (31, 312) have a tread design (32) and the characters and designs on the sidewall. The characters and designs on the sidewall add to processes and increase the complexity in manufacturing a tire mold.

With reference to FIG. 5, a conventional method of manufacturing a steel tire mold that has two half shells includes the following steps:

selecting a suitable material for the tire mold such as low-carbon steel or medium carbon steel;

cutting and shaping the material into different shapes on a lathe;

boring alignment and assembly holes into the parts of the half shell (31') to align and mate the mold parts;

assembling the parts into a steel half shell (31') to form a semi-finished tire mold;

manually cutting a tread design in the assembled steel half shell (31');

manually cutting characters, designs, etc. in the sidewall of the assembled steel half shell (31'); and dressing the surface of the half shell (31') to remove burrs and fine finishing the shape of the half shell (31') to meet the design requirements.

Through the application of the preceding steps, a finished steel tire mold is composed of two half shells and available for manufacturing tires.

Machines are used to perform all the steps described except cutting the tread design and the characters, designs, etc. In conventional methods, the tread and the characters and designs content are manually cut in these two steps, and the manual operations are not easy. The conventional methods of making steel molds for tires include the following shortcomings.

1. Long Production Time for the Mold

Generally, the tread design is complex and the carbon steel is hard to cut with hand tools so that the manufacturing time for the mold is long and slow.

2. More Employees

The manual operations require a skilled worker for each process. Since a skilled worker can only work one piece at a time, many skilled workers are required to simultaneously manufacture multiple molds.

3. Precision of the Finished Product is Limited by the Skill of the Worker

Hand cutting tools are extremely difficult to control precisely on a repeated basis. There is an inherent limitation to the precision of handmade pieces, and the precision of individual pieces is dependent on the talent and training of the worker and the time available. Generally speaking, handmade pieces are not as good as machine-made work pieces.

4. Noise Pollution

The handmade cutting causes noise that is potentially harmful to humans and pollutes the surrounding environment when workers cut the tread design and the character content for the mold.

5. High Production Cost

Because of the extensive manual operations, the production cost will be high, and the factory will lose competitiveness in business.

Therefore, a machine-made process must be developed to overcome the shortcomings. The present invention provides an improved process for manufacturing steel tire molds to mitigate and/or obviate the aforementioned problems.

SUMMARY OF THE INVENTION

A method for precisely and quickly manufacturing steel tire molds that have at least two half shells is provided.

The shapes of the half shells are designed with CAD software, and CAM software uses the CAD files to develop files and parameters for an electric discharge machine (EDM) and computer numerical controlled (CNC) engraving machines, drilling machines and lathes. After selecting an appropriate mold material such as low-carbon steel or medium carbon steel, the CNC lathe turns the materials into different designed parts of the mold. To ensure that these parts are aligned and assembled properly, location and positioning holes are bored in the mold parts using a boring process. The parts are assembled to form the half shell of a tire mold in an assembly process. An electric discharge machining (E.D.M.) device with a copper electrode that is shaped by the CNC drilling machine cuts the tread design in the half shell. Than, the CNC engraving machine cuts the characters and designs designed with CAD and CAM software into the half shell sidewalls. Finally, the half shell surface is dressed to remove any burrs to make a finished product.

Other objects, advantages and novel features of the invention will become more apparent from the following detailed description when taken in conjunction with the accompanying drawings.

DETAILED DESCRIPTION OF PREFERRED EMBODIMENT

Figure 1:
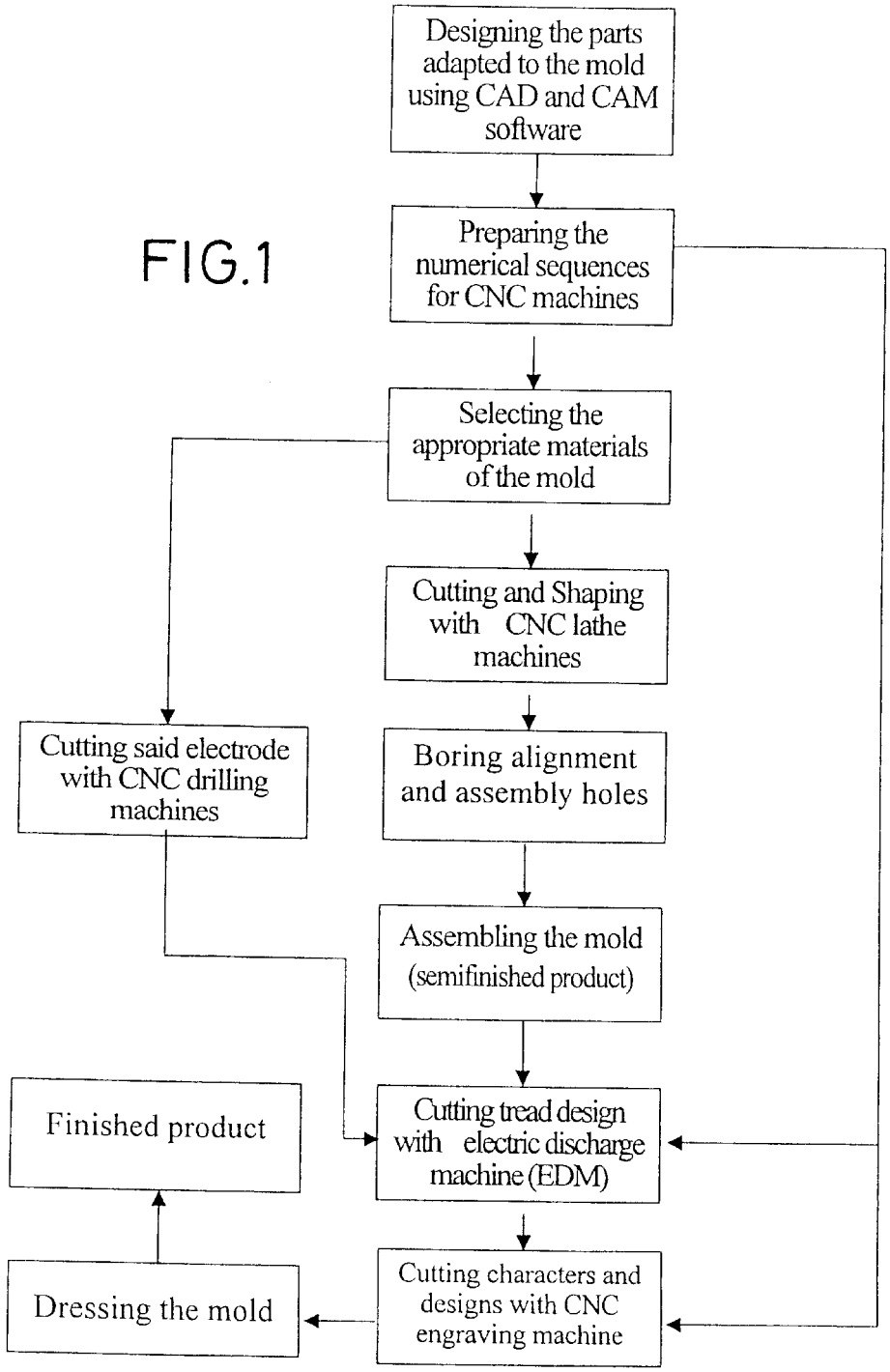
FIG. 1 is a block diagram of a method for manufacturing a steel tire mold in accordance with the present invention.
Figure 2:
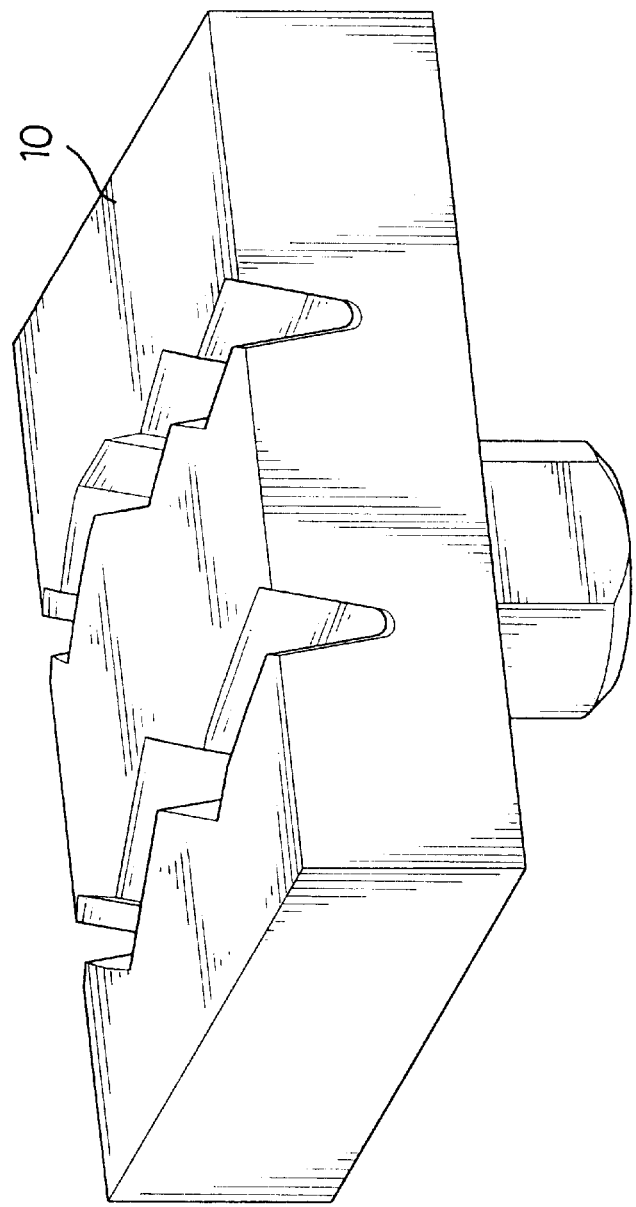
FIG. 2 is a perspective view of an electrode for cutting tread design on the mold with E.D.M.
Figure 3:
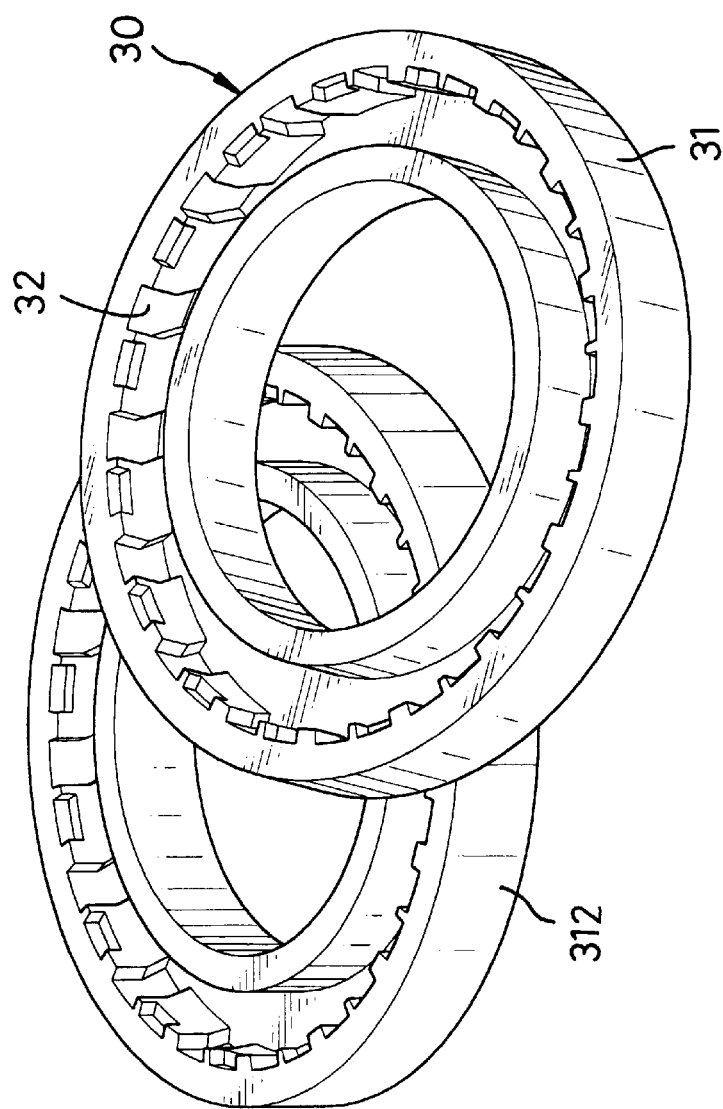
FIG. 3 is a perspective view of a steel mold for manufacturing tires, which has a tread design and is composed of more than one half shell.
Figure 4:
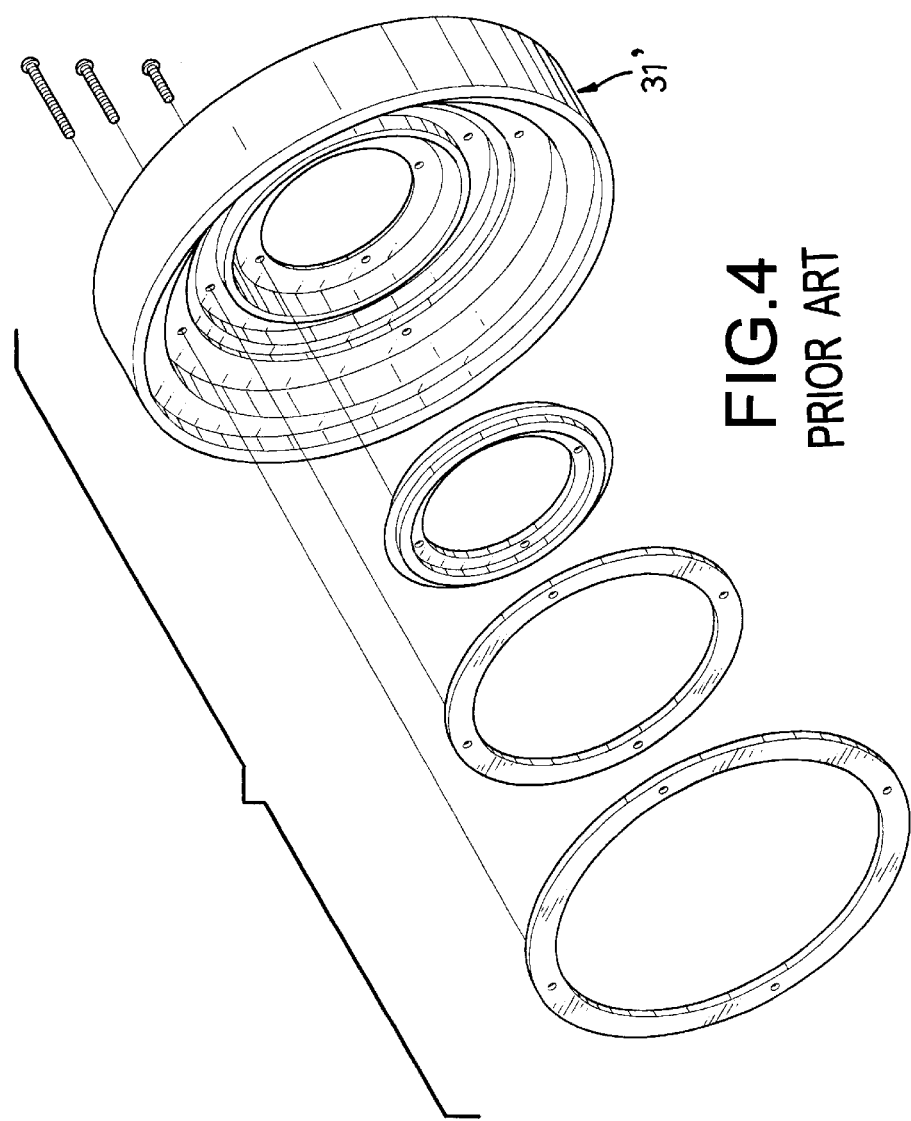
FIG. 4 is a perspective view of a half shell of a steel mold for manufacturing tires, which is composed of more than one part.
Figure 5:
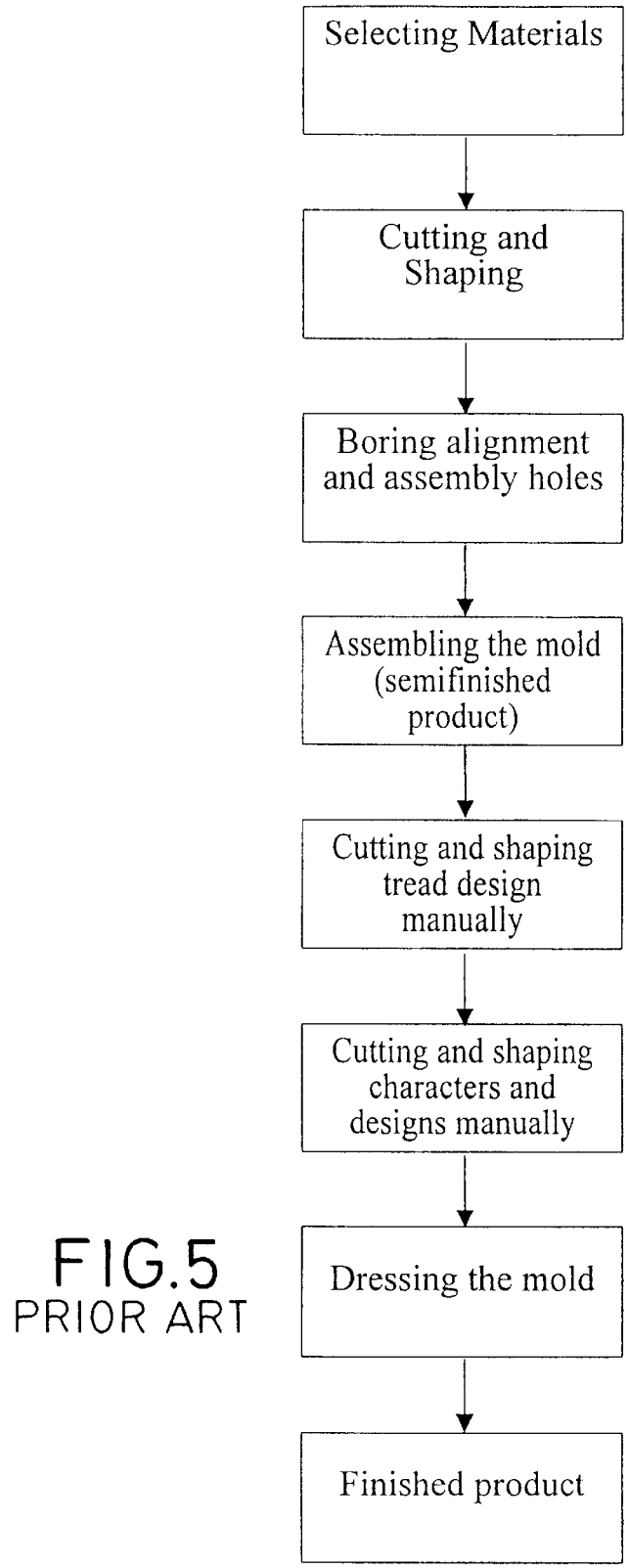
FIG. 5 is a block diagram of a conventional method for manufacturing a steel tire mold.

With reference to FIGS. 1 and 2, a method for manufacturing a steel tire mold that has two half shells and each half shell is composed of a single part in accordance with the present invention comprises the following steps:

designing the half shells, an electrode (10) and characters and designs using CAD and CAM software;

preparing the numerical sequences for an electric discharge machine (EDM) and computer numerical controlled (CNC) lathe, drilling machine and engraving machine;

selecting the appropriate material such as a low or medium carbon steel for the mold, copper for the EDM electrode (10) and tungsten steel for the engraving machine and lathe cutters;

cutting and shaping the selected material into a designed shape of the half shell with the CNC lathe and the numerical sequences;

cutting the copper electrode (10) by the CNC drilling machine into a designed shape;

cutting the tread design in the mold with the electric discharge machine (EDM), the electrode and the numerical sequences;

cutting characters and designs in the sidewalls of the assembled half shell with the CNC engraving machine and the numerical sequences;

dressing the half shell to remove burrs generated during the previous cutting and fabrication steps to obtain a finished half shell of the tire mold.

When the half shell is composed of at least two parts, a boring and an assembly steps are needed before the step of cutting the copper electrode by the CNC drilling machine into the designed shape. The boring step bores alignment and assembly holes into the parts of the half shell with a CNC drilling machine to align and mate the mold parts during assembly. The assembly step assembles the parts into the half shell by inserting pins or bolts into the alignment and assembly holes to obtain a semi-finished product.

The invention is a mechanized process for manufacturing steel tire molds. No manual cutting or grinding is required to form the tread design and the characters and designs for the tire mold. The method in accordance with the present invention has the following advantages:

1. Short Production Time

Because the tread design and the characters and designs on the tire mold are manufactured by automated CNC machines, mold production can be continuous, and the production efficiency is high.

2. Less Labor

When the work piece is mounted on the CNC machine bed, one worker can monitor several machines at the same time. Because a computer controls the CNC machines, many machines can be operated simultaneously, and the quality of the work on all the machines will be the same.

3. High Production Precision

The computer directly controls the machines, and the CNC machines can provide a high precision finish for the mold.

4. Low Noise Pollution

The CNC machines and the electric discharge machine have been designed to have lower noise and waste pollution when they are working so that the manufacturing environment is better.

5. Low Production Cost

The production cost is reduced because of the shorter production time, high production precision and low environment pollution.

Even though numerous characteristics and advantages of the present invention have been set forth in the foregoing description. It will be obvious to those skilled in the art that various modifications may be made without departing from what is intended to be limited solely by the appended claims.

What is claimed is:

1. A method for manufacturing a steel tire mold that has two half shells, the method comprising:

designing the shapes of the parts of the half shells, an electrode for an electric discharge machine (EDM) and characters and designs adapted to be on a tire rubber wall of a tire using CAD and CAM software;

preparing the numerical sequences for said electric discharge machine, a computer numerical controlled (CNC) lathe, a CNC drilling machine and a CNC engraving machine;

selecting the appropriate materials for said half shells, said electrode and tools for said machines;

cutting and shaping said selected materials for said half shells into designed shapes with said CNC lathe and the numerical sequences;

cutting said electrode into a designed shape;

cutting said tread design in said half shells by using said electrode with said electric discharge machine and the numerical sequences;

cutting said characters and designs in said half shells with said CNC engraving machine and the numerical sequences; and dressing said half shell surfaces to remove burrs.

2. A method for manufacturing a steel tire mold that has two half shells as claimed in claim 1, where before the step of cutting said electrode into a designed shape, there are two additional steps of:

boring alignment and assembly holes in said parts; and assembling said parts into said half shell and inserting fasteners into said alignment and assembly holes.

3. A method for manufacturing a steel tire mold that has two half shells as claimed in claim 2, wherein said fasteners are bolts.

* * * * *